(12) United States Patent
Lautenschlager et al.

(10) Patent No.: US 9,790,032 B2
(45) Date of Patent: Oct. 17, 2017

(54) DRIVE FOR A TRANSPORT DEVICE, SET OF DRIVES AND METHOD FOR DRIVING A TRANSPORT DEVICE

(71) Applicant: KRONES AG, Neutraubling (DE)

(72) Inventors: Franz Lautenschlager, Neutraubling (DE); Hartmut Davidson, Zeitlarn (DE); Johann Hüttner, Neutraubling (DE); Martin Seger, Neumarkt (DE); Reiner Kahl, Neutraubling (DE); Johannes Vierheilig, Zurich (CH)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 14/765,752

(22) PCT Filed: Feb. 3, 2014

(86) PCT No.: PCT/EP2014/052025
§ 371 (c)(1),
(2) Date: Aug. 4, 2015

(87) PCT Pub. No.: WO2014/139727
PCT Pub. Date: Sep. 18, 2014

(65) Prior Publication Data
US 2016/0046448 A1   Feb. 18, 2016

(30) Foreign Application Priority Data
Mar. 14, 2013  (DE) .......... 10 2013 204 436

(51) Int. Cl.
*B65G 23/22*     (2006.01)
*H02K 7/116*    (2006.01)
(Continued)

(52) U.S. Cl.
CPC ............. *B65G 23/22* (2013.01); *H02K 1/187* (2013.01); *H02K 1/2786* (2013.01); *H02K 1/28* (2013.01);
(Continued)

(58) Field of Classification Search
CPC ........... H02K 7/102; H02K 5/15; H02K 7/14; H02K 7/116; H02K 1/187; H02K 1/2786;
(Continued)

(56) References Cited

U.S. PATENT DOCUMENTS 4,037,496 A * 7/1977 Gerth ................. B23Q 5/10
82/142
5,105,936 A * 4/1992 Stapper .............. B65G 23/22
198/832
(Continued)

FOREIGN PATENT DOCUMENTS

CN  102195401 A   9/2011
CN  202469308 U  10/2012
(Continued)

OTHER PUBLICATIONS

International Search Report for Application No. PCT/EP2014/052025, dated Jul. 22, 2015.
(Continued)

*Primary Examiner* — Mark A Deuble
(74) *Attorney, Agent, or Firm* — Marshall, Gerstein & Borun LLP

(57) ABSTRACT

A drive for a transport device, such as a conveyor belt, the drive including an external rotor motor having a stator and a rotor, and a gear unit having a shaft and an input drive gear. A set of drives in which external rotor motors of different sizes, including stators of identical diameter and different heights with corresponding rotors, and/or gear units having different speed-increasing stages or speed-reducing stages,
(Continued)

are provided. Also, a method for driving a transport device using the drive.

35 Claims, 12 Drawing Sheets

(51) Int. Cl.
| | |
|---|---|
| *H02K 1/18* | (2006.01) |
| *H02K 1/27* | (2006.01) |
| *H02K 7/00* | (2006.01) |
| *H02K 5/10* | (2006.01) |
| *H02K 5/15* | (2006.01) |
| *H02K 7/14* | (2006.01) |
| *H02K 1/28* | (2006.01) |
| *H02K 7/08* | (2006.01) |
| *H02K 7/102* | (2006.01) |
| *H02K 5/04* | (2006.01) |
| *H02K 21/22* | (2006.01) |

(52) U.S. Cl.
CPC .............. *H02K 5/04* (2013.01); *H02K 5/10* (2013.01); *H02K 5/15* (2013.01); *H02K 7/003* (2013.01); *H02K 7/085* (2013.01); *H02K 7/102* (2013.01); *H02K 7/1025* (2013.01); *H02K 7/116* (2013.01); *H02K 7/14* (2013.01); *H02K 21/22* (2013.01); *H02K 2205/09* (2013.01); *H02K 2213/12* (2013.01)

(58) Field of Classification Search
CPC .......... H02K 7/003; H02K 1/28; H02K 7/085; H02K 7/1025; H02K 5/04; H02K 5/10; H02K 21/22; H02K 2213/12; H02K 2205/09; B65G 23/22
See application file for complete search history.

(56) References Cited

U.S. PATENT DOCUMENTS

| | | | |
|---|---|---|---|
| 6,420,805 | B1 | 7/2002 | Yamaguchi et al. |
| 2006/0237602 | A1* | 10/2006 | Whitley ................ B65G 23/22 248/205.1 |
| 2011/0169379 | A1 | 7/2011 | Ai |
| 2011/0221293 | A1 | 9/2011 | Katoh et al. |
| 2012/0192409 | A1 | 8/2012 | Horng |
| 2012/0194018 | A1 | 8/2012 | Miyauchi et al. |
| 2013/0307320 | A1* | 11/2013 | Akamatsu ........... B60L 15/2054 301/6.5 |
| 2014/0028136 | A1* | 1/2014 | Cemke .................. H02K 7/003 310/91 |

FOREIGN PATENT DOCUMENTS

| | | |
|---|---|---|
| DE | 102006047883 B3 | 10/2007 |
| DE | 102008026243 A1 | 12/2009 |
| EP | 1553683 A1 | 7/2005 |
| EP | 1751008 A2 | 2/2007 |
| EP | 2338813 A1 | 6/2011 |
| GB | 2252137 A | 7/1992 |
| JP | 2010136596 A | 6/2010 |
| JP | 2012171428 A | 9/2012 |
| WO | WO-2005115848 A2 | 12/2005 |
| WO | WO-2007006324 A1 | 1/2007 |

OTHER PUBLICATIONS

English Translation of the Second Office Action for Chinese Application No. 201480013147.2, dated Aug. 11, 2017.

* cited by examiner

US 9,790,032 B2

DRIVE FOR A TRANSPORT DEVICE, SET OF DRIVES AND METHOD FOR DRIVING A TRANSPORT DEVICE

CROSS-REFERENCE TO RELATED APPLICATION

The present application is the US national phase of International Patent Application No. PCT/EP2014/052025, filed Feb. 3, 2014, which application claims priority to German Application No. 102013204436.4, filed Mar. 14, 2013. The priority application, DE 102013204436.4, is hereby incorporated by reference.

FIELD OF THE INVENTION

The present invention relates to a drive for a transport device, such as a conveyor belt, which is adapted to be used e.g. in the beverage and food industry, a set of drives and a method for driving a transport device.

PRIOR ART

It is known that, for a given overall size, the torque output of an external rotor motor is higher than that of an internal rotor motor, since the magnetic thrust force between the stator and the rotor acts on a larger diameter. This allows a very compact overall size of the external rotor motor in combination with a nevertheless low nominal torque.

EP 2 338 813 B1 discloses the use of an external rotor motor whose stator is releasably mounted on a stationary column and whose rotor carries a star wheel and supports it via the stator on the column. The external rotor motor may be structurally integrated in the star wheel as a direct drive or it may be attached to said star wheel. The column may comprise a hollow basic body and a shaft journal, which projects on the upper side of the latter and on which the stator is fixed in position. The stator may be hollow cylindrical in shape and it may be attached to the outer side of the shaft journal and fixed thereto.

EP 1 751 008 A2 discloses a cyclically driven external rotor motor as a drive unit for a turntable. The rotor is configured as a housing, which may simultaneously define the turntable and which, bypassing the stator, is rotatably supported on the conveyor table by means of a separate rotary bearing. The stator comprises windings and is supported on a conveyor table.

DE 10 2008 026 243 A1 discloses the use of an electric motor as a direct drive, said electric motor comprising a stator and a rotor with a rotary shaft. The rotary shaft of the rotor is directly connected to the shaft of a roller. The direct drive has no gear unit, so that oil fillings are not necessary.

WO 2007/006324 A1 discloses the use of an electric motor, e.g. a torque motor, which comprises a stator and a rotor with permanently excited magnets and which acts directly onto a conveyor belt. Hence, it is not necessary to use a gear unit with the aid of which the driving power of the motor can be transmitted to the conveyor belt.

OBJECT OF THE INVENTION

It is the object of the present invention, to provide a drive for a transport device, which has a high nominal torque and which can be used effectively.

The drive for a transport device, such as a conveyor belt configured for conveying articles, preferably containers or preforms, comprises an external rotor motor, comprising a stator and a rotor, and a gear unit, comprising a shaft and an input drive gear. The external rotor motor allows driving with a high nominal torque, and the driving power of the external rotor motor can be transmitted to the conveyor belt by means of the gear unit.

The external rotor motor and the gear unit may be of modular construction. Thus, it is possible to equip an already existing gear unit with a different external rotor motor. For example, different materials can be used for the permanent magnets for different rotors. It is also possible to use a smaller or a larger stator height; in this case, a corresponding rotor must be used and it may become necessary to adapt the length of the shaft of the gear unit. For a stator height of less than 200 mm, nominal torques in a range of 6 Nm to 12 Nm and nominal speeds at a nominal frequency of 100 Hz in a range of 2,000 to 3,000 revolutions per minute are provided.

According to an advantageous embodiment, all motor strengths have the same diameter and differ from one another only with respect to the stator height. Hence, the external rotor motor can be exchanged easily while maintaining the gear unit. According to a particularly advantageous embodiment, the stator diameter is in a range of 160±30 mm. The stator height is then approx. 55±20 mm in the case of 6±2 Nm and approx. 80±20 mm in the case of 12±2 Nm.

The stator and the rotor may be arranged in a motor housing. The stator and the rotor are thus protected against contamination, e.g. from the surroundings of the transport device.

The motor housing may comprise an internal, circumferentially extending rubber-elastic ring, preferably an O-ring. This ring provides a sealing effect between the motor housing and an adapter plate, onto which the stator can be mounted, or between the motor housing and the gear casing in the event that no adapter plate is provided. The interior of the motor housing is thus protected against contamination, e.g. from the surroundings of the transport device.

The rotor may be arranged on the shaft, said rotor being preferably configured such that it is releasable from said shaft. This allows an easy and rapid exchange of the rotor and of the shaft, respectively. This also makes sense for the modular construction of the external rotor motor and of the gear unit. In addition, it will suffice to only provide a shaft in the gear unit, and the rotor need not have any additional shaft.

The rotor may here be configured such that it is connectable to the shaft, in a form- and/or force-fit manner, by means of a fitting key, a cone and/or a fit. Due to the form-and/or force-fit connection, a transmission of force from the rotor to the shaft of the gear unit is possible during operation of the drive.

The shaft may be configured as a continuous, i.e. one-piece component extending from the input gear in the gear unit up to the rotor. The one-piece shaft offers a stable possibility of allowing, during operation of the drive, a transmission of force from the rotor to the shaft and from there to the gear unit.

A double bearing for the shaft may be provided in the gear unit, preferably by making use of angular contact ball bearings (e.g. according to DIN (German Industrial Standard) 628), so that e.g. forces of a brake can be taken up, and, particularly preferred, the external rotor motor is not provided with a bearing for the shaft.

Angular contact ball bearings have, in the inner and outer races, raceways which are displaced relative to one another in the direction of the bearing axis. They are specially suitable for bearings that are intended to take up radial and axial loads.

Double bearing means here that two spaced-apart bearings are arranged along the longitudinal axis of the shaft within the gear unit. The larger the distance between the two bearings along the longitudinal axis is, the greater the support stability of the shaft in the gear unit will be.

Due to the double bearing of the shaft, the latter is supported so stably that a fitting key, a cone and/or a fit will suffice for establishing a form-fit and/or force-fit connection with the rotor. Hence, an additional bearing for the shaft is not necessary in the external rotor motor. The external rotor motor may, however, comprise an additional bearing for the shaft.

Instead of the double bearing, also three, four or more than four bearings for the shaft may be provided in the gear unit, said three, four or more bearings being arranged in spaced-apart relationship with one another along the longitudinal axis. The respective distances may be identical or they may differ from one another.

The stator may be centered centrally relative to the shaft by means of a conical contact surface. The conical contact surfaces offer a low-maintenance possibility of guaranteeing centering of the stator relative to the shaft. In addition, the conical contact surfaces may be configured such that they have comparatively large dimensions, so that centering will be carried out in a reliable manner.

According to another embodiment, the stator may be centered centrally relative to the shaft by means of a centering sleeve and then fixed in position by means of screws.

Preferably, outer surfaces of the drive do not have any upwardly directed, horizontal surfaces. On upwardly directed, horizontal surfaces, dirt particles, liquids or the like may deposit, and this would contravene hygiene efforts. The upwardly directed surfaces may be roof-shaped, so that deposits on these surfaces will be avoided.

The rotor may carry an iron ring, which establishes a magnetic circuit, the iron ring being preferably a laminated sheet package and/or embedded in plastic. A stable structural design of the rotor is given by said iron ring and, in addition, said iron ring may be used for accommodating the permanent magnets, so that additional mounting facilities for the permanent magnets need not be provided. The iron ring is configured such that it establishes (as a yoke) a magnetic circuit between neighboring permanent magnets and between the reception means thereof.

The permanent magnets may be inserted in the laminated sheet package or in the plastic in a in a form-fit manner and may there be secured in position, preferably by means of an adhesive and/or through locking engagement. The permanent magnets are here arranged in the iron ring such that the north and south poles, respectively, of juxtaposed permanent magnets are alternately directed outwards towards the motor housing. The interaction of the permanent magnets with the iron ring and with the motor coils of the stator in their entirety leads to a drive of the rotor and thus of the shaft, which transmits the driving force to the gear unit.

The permanent magnets may consist of hard ferrite and/or rare-earth magnets, such as neodymium iron boron and/or aluminum nickel cobalt.

An adapter plate may be provided between the gear unit and the external rotor motor, wherein the adapter plate comprises an adapter-plate shaft sealing ring. The adapter-plate shaft sealing ring can protect the external rotor motor against oil that may escape from the gear unit. Since the shaft extends from the gear unit through the adapter plate up to and into the stator and the rotor, it makes sense to seal the external rotor motor against the gear unit in this way, so as to protect the external rotor motor against damage caused by oil penetrating thereinto from a (leaky) gear unit. The adapter plate may also comprise more than one adapter-plate shaft sealing ring.

The gear unit may be open on a side facing the external rotor motor. In this case, it will make sense when the adapter plate comprises at least two adapter-plate shaft sealing rings that are spaced apart at a certain distance. Oil escaping from the gear unit can enter into an empty space between the adapter-plate shaft sealing ring located closest to the gear unit and a neighboring adapter-plate shaft sealing ring that is more distant from the gear unit, without direct damage being caused to the external rotor motor. The adapter plate may include a hole leading from the empty space between the two adapter-plate shaft sealing rings (at an oblique angle) downwards to the exterior of the adapter plate. Through said hole, oil which enters the empty space can be discharged to the outside by means of said hole. It follows that, if oil escapes through said hole, it can be concluded that the adapter-plate shaft sealing ring located closest to the gear unit leaks.

According to another embodiment, the gear unit may be enclosed and a gear-unit shaft sealing ring may be provided so as to seal the shaft. The gear-unit shaft sealing ring prevents the oil from escaping to the outside, so that the surroundings will not be contaminated and the gear unit will not be damaged due to lack of oil.

A thread insert may fix the gear-unit shaft sealing ring in position. This guarantees that the gear-unit shaft sealing ring will not be displaced and can thus work efficiently.

The gear-unit shaft sealing ring may advantageously run on a hardened sleeve, which is applied to the shaft, e.g. shrunk on said shaft. Through this arrangement, the shaft can be protected against the influence of the gear-unit shaft sealing ring, since the latter acts on the hardened sleeve, whereby wear phenomena on the shaft itself will be prevented.

Preferably, the gear unit does not have a vent screw.

The gear unit may be configured such that it comprises one, two, three or more than three speed-increasing stages or speed-reducing stages. Through various speed-increasing stages, the transmission of force of the drive to the transport device can optimally be controlled and selected. Gear units having an output torque (nominal torque) of 300±100 Nm and/or 600±200 Nm can be provided. These two gear unit ratings are advantageously provided with the same connection dimensions and they are attached to the differently powered external rotor motors as required.

A speed-increasing stage or speed-reducing stage can be realized by interaction between two spur gears, between a bevel gear and a spur gear or by means of a planetary gearing.

The gear unit may comprise comprises a hollow shaft on the output side, which preferably consists of stainless steel and/or has a surface finish, such as a QPQ nitration. By means of the hollow shaft, force can be transmitted during operation of the drive.

The gear unit can be configured for being oriented in four modes of orientation relative to the adapter plate and for connection to the adapter plate. For example, it is possible to arrange the gear unit such that the hollow shaft is directed upwards or downwards or that the hollow shaft is oriented towards the right or the left.

The adapter plate may additionally include a hole leading from an area between the adapter-plate shaft sealing ring and the gear-unit shaft sealing ring (at an oblique angle) downwards to the exterior of the adapter plate, said area being defined, when the adapter plate and the gear unit are connected to one another (in a form-fit manner).

Through said hole, oil, which enters the empty space—e.g. through a leaky gear-unit shaft sealing ring—can be discharged to the outside by means of said hole. It follows that, if oil escapes through said hole, it can be concluded that the gear-unit shaft seal leaks.

In addition, the hole may be provided with a sight glass on the exterior of the adapter plate. If escaping oil is collected in said sight glass, a discharge of oil to the periphery is prevented, but leakage of a shaft seal can still be detected.

The adapter plate may additionally comprise at least one passage for electric connection wires. The electric wires for the motor coils and/or the brake may run in this passage, by way of example, so that the connection wires need not be arranged outside of the external rotor motor. After insertion of the wires, it will be of advantage to close the passage, possible variants being potting with resin or filling with a silicone-based material by means of injection.

The adapter plate may comprise an external terminal board by means of which motor coils can be contacted. The external terminal board provides a stable and reliable connection of the electric connection wires of the motor coils and ensures thus stable and reliable contacting of said motor coils. The external terminal board is preferably provided on a downwardly directed side of the drive.

The drive may further comprise a brake arranged in linear alignment with the rotor and the shaft. Standstill of the drive can thus be controlled effectively, since the brake will brake or block when the drive is standing still. By means of such braking or blocking of the brake during standstill of the drive, e.g. undesirable movements of the transport device can be prevented. When the drive is in operation, the braking or blocking effect of the brake is eliminated.

The brake may be of modular construction and may preferably be arranged in a cover of the motor housing. Thus, a brake can be added to an already existing external rotor motor having no brake. The arrangement of the brake in the cover of the motor housing additionally allows an easy and safe arrangement of the brake on the external rotor motor and the motor housing.

The brake may be secured in position in the cover, said cover serving as a torque support of the brake. The fixing of the brake in the cover of the motor housing allows an easy and safe arrangement of the brake on the external rotor motor and the motor housing. Due to the fact that the cover serves as a torque support of the brake, no disturbing or detrimental torques will act on the external rotor motor and the gear unit.

The brake may comprise a brake disk arranged on an extended shaft or a rotor bell. The brake disk may e.g. interact with brake pads on both sides thereof, so that the brake will brake. In the case of wear, the brake disk can easily be replaced by a new brake disk.

According to another embodiment, a rotor bell may comprise a brake surface. If the rotor bell comprises a brake surface, it will not be necessary to provide an additional brake disk.

The cover may comprise connection wires for a brake coil, which are preferably configured such that, when the cover and the motor housing are connected in a form-fit manner, contacting will take place. Thus, it is not necessary to route the connection wires outside of the cover. In addition, through the automatic contacting taking place when the cover and the motor housing are connected in a form-fit manner, manual contacting, e.g. by connecting connection wires to a terminal board or the like, will not be necessary.

Alternatively, the drive may comprise a return stop instead of the brake.

In addition, the present invention comprises a set of drives according to one of the drive embodiments referred to above or below, wherein external rotor motors of different sizes, which comprise stators of identical diameter and different heights with corresponding rotors, and/or gear units having different speed-increasing stages or speed-reducing stages, are provided. The height of the stator means here the dimensions of the stator along the longitudinal axis of an opening in the stator, which is adapted to accommodate the shaft of the gear unit.

In addition, the present invention comprises a method for driving a transport device, such as a conveyor belt configured for conveying articles, preferably containers or preforms, making use of a drive of the type described hereinbefore or hereinbelow.

BRIEF DESCRIPTION OF THE FIGURES

Further advantages and embodiments can be seen from the drawings enclosed, in which.

DETAILED DESCRIPTION OF THE FIGURES

Figure 1:
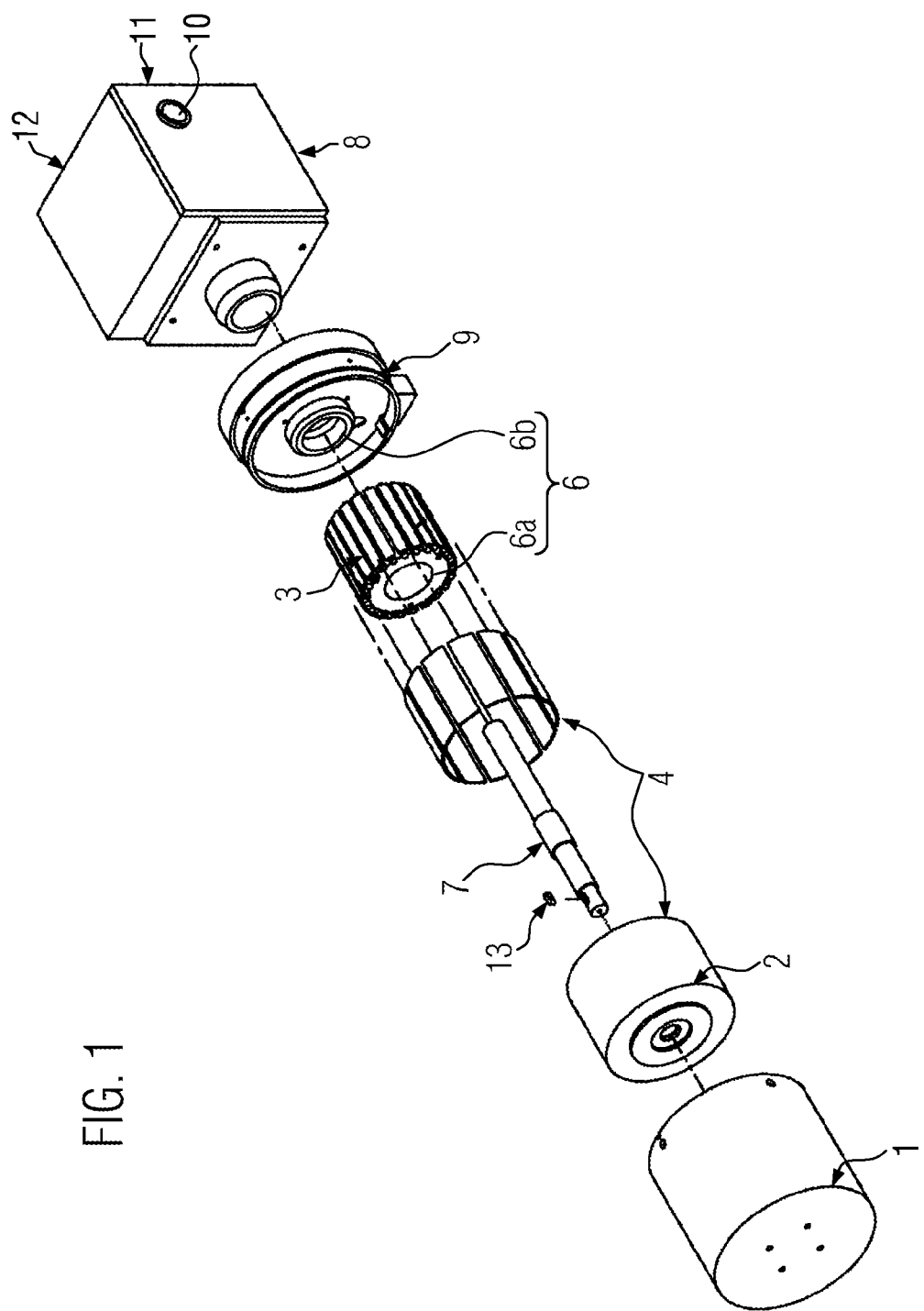
FIG. 1 shows a perspective view of the components of a drive for a transport device.

FIG. 1 shows a schematic representation of the components of a drive for a transport device. What can be seen is a cover 1, which may comprise a brake; the brake is not visible in the representation, since it is arranged inside the cover 1. The cover 1 with the brake is an optional element of the drive. Instead of the cover 1, an external rotor motor can be covered by a part of the motor housing at this location. The external rotor motor is composed of a rotor 2 and of a stator 3. As regards the rotor 2, an iron ring 4 encompassing the rotor 2 can be seen, the permanent magnets being arranged—in a non-visible manner—on the inner side of said iron ring 4. As regards the stator 3, the motor coils 5 can be seen, which interact with the magnets of the rotor 2. In addition, an opening 6 is shown, which comprises an opening 6a in the stator 3 and an opening 6b in the adapter plate 9, said opening 6 being adapted to accommodate a shaft 7 of the gear unit 8. Between the gear unit 8 and the external rotor motor, an adapter plate 9 is provided, which has the stator 3 mounted thereon in FIG. 1. The gear unit 8 comprises the shaft 7, which extends through the stator 3 and up to the rotor 2, when the components of the drive have been assembled in a form-fit manner.

In addition, the gear unit 8 comprises a hollow shaft 10 on the output side. The gear unit 8 is configured such that it can be arranged on the adapter plate 9 in four different modes of arrangement. In the arrangement shown in FIG. 1, the hollow shaft 10 is directed forwards into the picture plane. If the gear unit 8 is rotated clockwise by 90° with a viewing direction along the shaft 7 towards the free end of the shaft, the hollow shaft 10 will be directed upwards, after a further clockwise rotation by 90° the hollow shaft 10 will be directed backwards, and after a further clockwise rotation by 90° the hollow shaft 10 will be directed downwards.

The gear casing 11 is preferably shaped such that the upwardly directed surfaces 12 of the gear casing 11 do not exhibit any horizontal areas, but that the upwardly directed surfaces are roof-shaped, so that deposits or accumulations of liquid (puddles) on the upwardly directed surfaces will be avoided.

The shaft 7 of the gear unit 8 has on its free end, i.e. on the end that is not directly connected to the gear unit, a fitting key 13, which is adapted to interact in a form-fit manner with a complementary groove of the rotor 2.

FIG. 1 illustrates the modular structural design of the drive, which allows an easy replacement of elements. For example, the stator 3 is intended to have the same diameter for different sizes of the external rotor motor and to differ only with respect to height. Height means here the dimensions of the stator 3 along the longitudinal axis of the opening 6a. In addition, the material of the magnets in the rotor 2 may be chosen differently for different external rotor motors.

Figure 2:
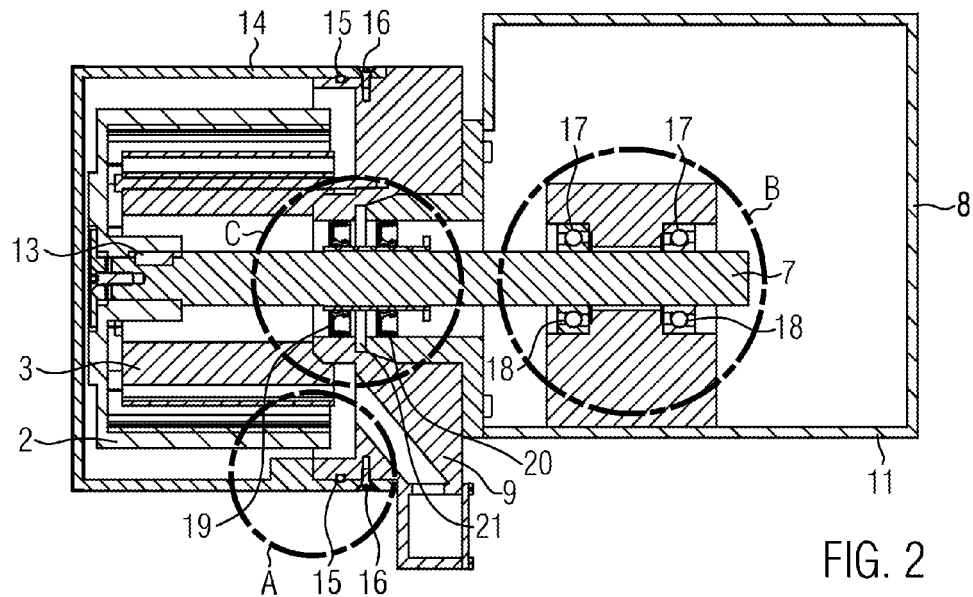
FIG. 2 shows a schematic cross-section through a drive.

FIG. 2 shows a schematic cross-section through a drive including an enclosed gear unit 8 comprising a shaft 7, an adapter plate 9 having a stator 3 mounted thereon and a rotor 2, the external rotor motor being accommodated in a motor housing 14.

Figure 2A:
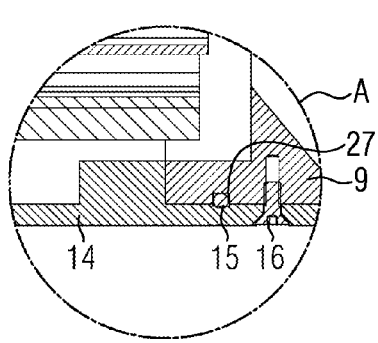
FIG. 2a shows an enlarged detail of FIG. 2, the rubber-elastic ring of the motor housing.
Figure 2B:
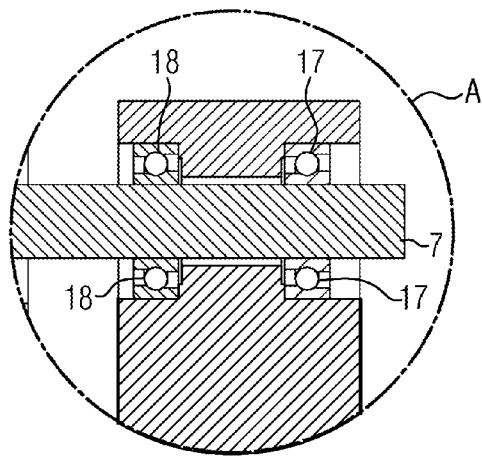
FIG. 2b shows an enlarged detail of FIG. 2, the double bearing of the shaft in the gear unit.
Figure 2C:
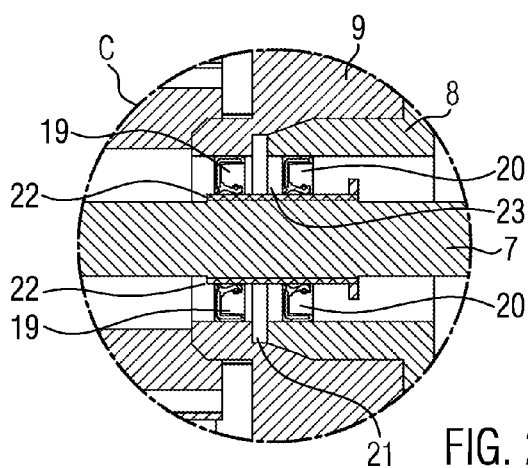
FIG. 2c shows an enlarged detail of FIG. 2, the gear-unit shaft sealing ring and the adapter-plate shaft sealing ring.

FIGS. 2a, 2b and 2c show enlarged details of FIG. 2, in which the arrangement of the rubber-elastic ring 15 of the motor housing 14, the double bearing 17, 18 of the shaft 7 in the gear unit 8 and the arrangement of the adapter-plate shaft sealing ring 19 and of the gear-unit shaft sealing ring 20 are shown in an enlarged representation.

The motor housing 14, which encompasses the rotor 2 and the stator 3 on an end-face side and on the side of the circumferential surface, is provided with an internal, circumferentially extending rubber-elastic ring 15. This ring 15 ensures sealing between the motor housing 14 and the adapter plate 9, which partly rests on the inner surface of the motor housing 14 when the stator 3 has been mounted on the adapter plate 9. The adapter plate 9 includes a circumferentially extending groove 27, which is configured for accommodating the rubber-elastic ring 15 of the motor housing 15. In addition, the motor housing 14 and the adapter plate 9 are screwed together by means of screws 16 so as to guarantee that these components are stably held together and that also the ingress of particles and the like from the surroundings is prevented.

The shaft 7 is supported in the gear unit 8 in a double bearing 17, 18, so that no additional bearing for the shaft 7 is required in the external rotor motor. It will suffice to fix the shaft 7, e.g. by means of the fitting key 13, to the complementary groove of the rotor 2 in a form- and/or force-fit manner. As shown, the shaft 7 can be supported e.g. by means of angular contact ball bearings 17, 18, so that e.g. forces of a brake can be taken up. As shown, the double bearing of the shaft 7 is to be understood such that, along the longitudinal axis of the shaft 7, two bearings are arranged within the gear unit 8 in spaced relationship with each other.

The adapter plate 9 includes an adapter-plate shaft sealing ring 19, which is arranged around an area of the opening 6b, so as to protect the external rotor motor against oil that may escape from the gear unit 8. Since the shaft 7 extends from the gear unit 8 through the adapter plate 9 up to and into the stator 3 and the rotor 2, it makes sense to seal the external rotor motor against the gear unit 8 in this way, so as to protect the external rotor motor against damage caused by oil penetrating thereinto from a leaky gear unit. The gear unit 8 includes a gear-unit shaft sealing ring 20 for sealing the shaft 7 in the area where it leaves the gear casing 11. The adapter-plate shaft sealing ring 19 and the gear-unit shaft sealing ring 20 have provided between them an empty space 21. The adapter plate 9 has formed therethrough a hole, which terminates in this empty space 21 and which is oriented downwards, so that oil that enters the empty space 21—e.g. through a leaky gear-unit shaft sealing ring 20—can be discharged to the outside by means of said hole. It follows that, if oil escapes through said hole, it can be concluded that the gear-unit shaft sealing means 20 leaks. The outer end of the hole may also have provided thereon a sight glass (not shown), in which escaping oil is collected. A discharge of oil to the periphery is thus prevented, but oil leakage can still be detected.

The gear-unit shaft sealing ring 20 runs on a hardened sleeve 22, which is e.g. shrunk onto the shaft 7. In addition, the gear-unit shaft sealing ring 20 is centered by means of a thread insert 23. In the case of wear of the hardened sleeve 22, it will suffice to replace said sleeve, whereas it will not be necessary to replace the shaft 7.

The adapter plate 9 and the gear casing 11 each comprise conical contact surfaces, which cooperate such that the adapter plate 9 and the gear casing 11 match in a form-fit manner and that, in addition, the shaft 7 is centered in the opening 6b of the adapter plate 9. Furthermore, also the adapter-plate shaft sealing ring 19 runs on the hardened sleeve 22 of the shaft 7, when the shaft 7 has been passed through the area of the opening 6b in the adapter plate 9.

Figure 3:
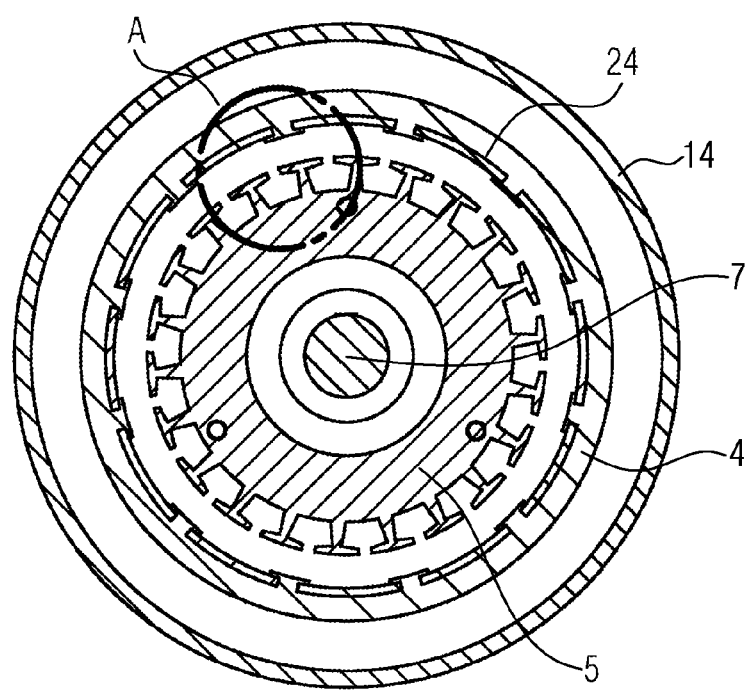
FIG. 3 shows a schematic representation of a cross-section through an external rotor motor.
Figure 3A:
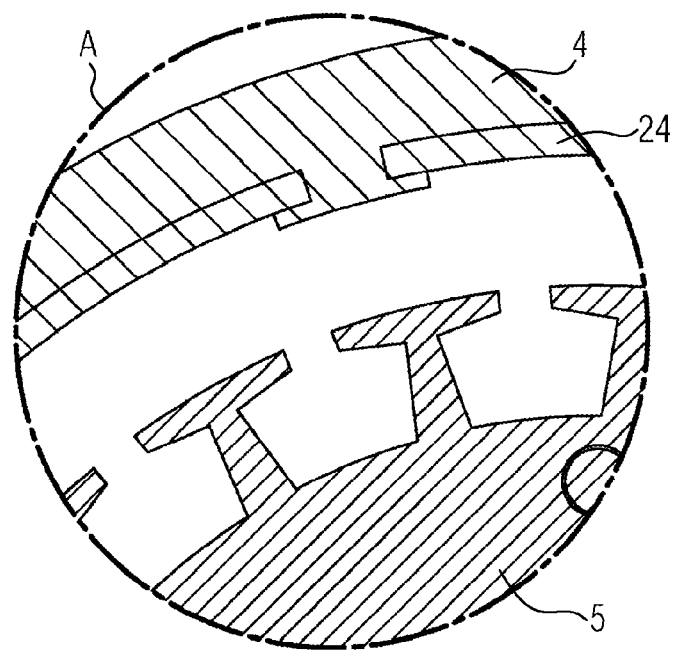
FIG. 3a shows an enlarged detail of FIG. 3, the iron ring of the rotor with the permanent magnets.

FIG. 3 shows a cross-section through the external rotor motor, the components shown being the motor housing 14, the rotor 2, the stator 3 and the shaft 7. The rotor 2 carries the iron ring 4, which establishes a magnetic circuit. The iron ring 4 is a laminated sheet package and/or embedded in plastic, so that, in the case shown, the iron ring 4 has twelve recesses into which a corresponding number of twelve permanent magnets 24 can be introduced. FIG. 3a shows an enlarged detail of FIG. 3, in which the permanent magnets 24 in the iron ring 4 can be seen more clearly. These permanent magnets 24 are arranged in the iron ring 4 such that the north and south poles, respectively, of juxtaposed permanent magnets 24 are alternately directed outwards towards the motor housing 14. The interaction of the permanent magnets 24 with the iron ring 4 and with the motor coils 5 of the stator 3 in their entirety leads to a drive of the rotor 2 and thus of the shaft 7, which transmits the driving force to the gear unit 8.

Figure 4:
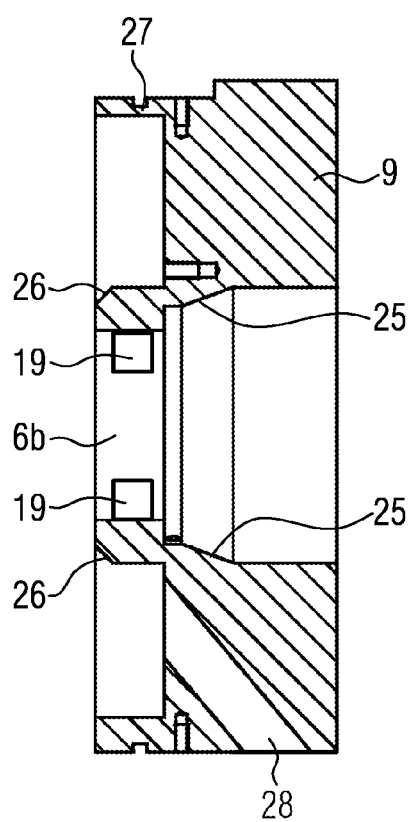
FIG. 4 shows a schematic cross-section of an adapter plate.

FIG. 4 shows a cross-section through an adapter plate 9. The figure shows the conical contact surfaces 25 in the interior of the opening 6b, which cooperate with complementary conical contact surfaces of the gear casing 11 such that the adapter plate 9 and the gear casing 11 match in a form-fit manner and that, in addition, the shaft 7 is centered in the opening 6b of the adapter plate 9. The adapter plate 9 includes an adapter-plate shaft sealing ring 19, which is arranged around an area of the opening 6b, so as to protect the external rotor motor against oil that may escape from the gear unit 8.

Additional conical contact surfaces 26 are shown, which cooperate with complementary conical contact surfaces of the stator 3 such that the adapter plate 9 and the stator 3 match in a form-fit manner.

For accommodating the rubber-elastic ring 15 of the motor housing 14, the adapter plate 9 is provided with a circumferentially extending groove 27.

The adapter plate 9 includes a passage 28 used for accommodating e.g. electric wires for the motor coils 5, by way of example.

The first end of the end 29 of the throughhole in the adapter plate 9 is arranged in the empty space 21 between the adapter-plate shaft sealing ring 19 and the gear-unit shaft sealing ring 20. The hole is directed (at an oblique angle) downwards, so that oil which enters the empty space 21 can be discharged to the outside by means of said hole via the second end 30 thereof; in FIG. 4a, the first end 29 and the second end 30 are shown (dashed).

Figure 4A:
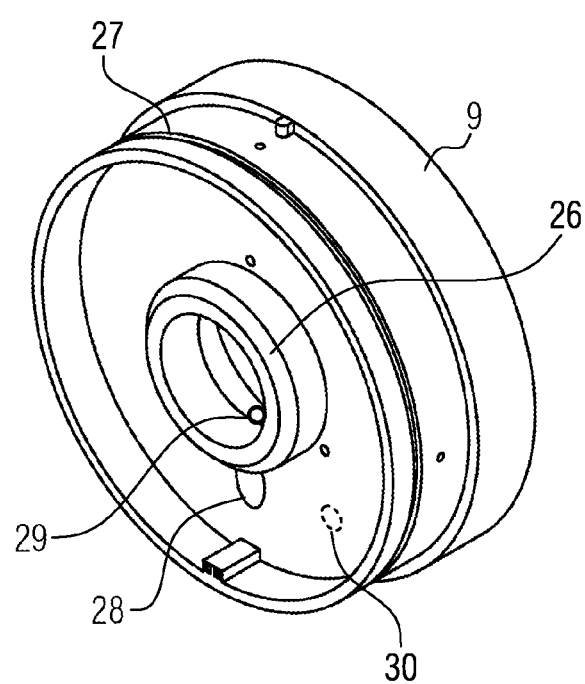
FIG. 4a shows a perspective view of FIG. 4.

FIG. 4a shows a perspective view of FIG. 4, in which the adapter-plate shaft sealing ring is not shown. In addition, one end of the passage 28 for electric wires is shown in said FIG. 4.

Figure 5:
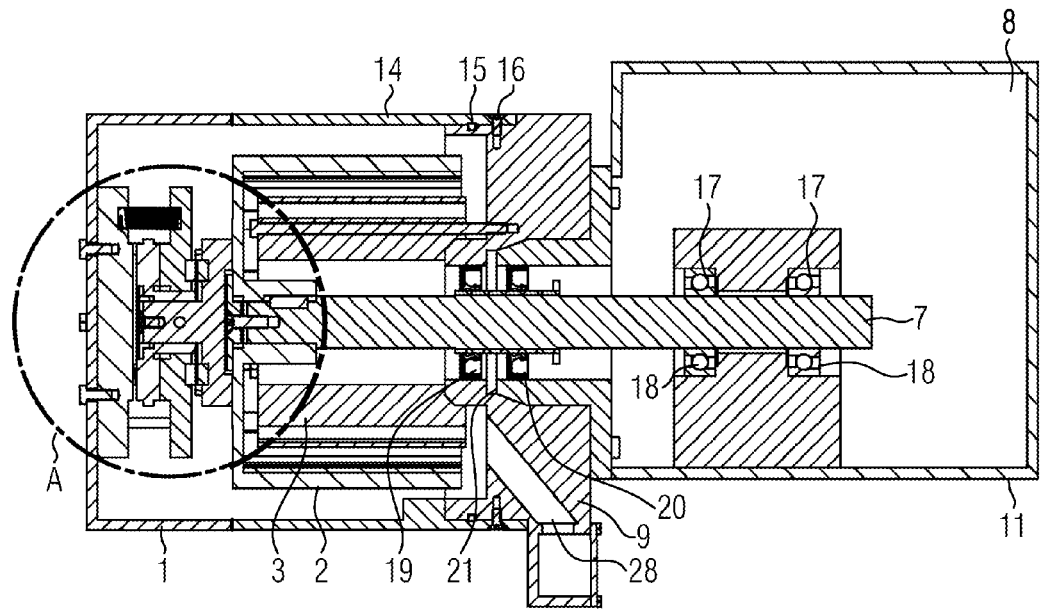
FIG. 5 shows a first embodiment of a brake.
Figure 5A:
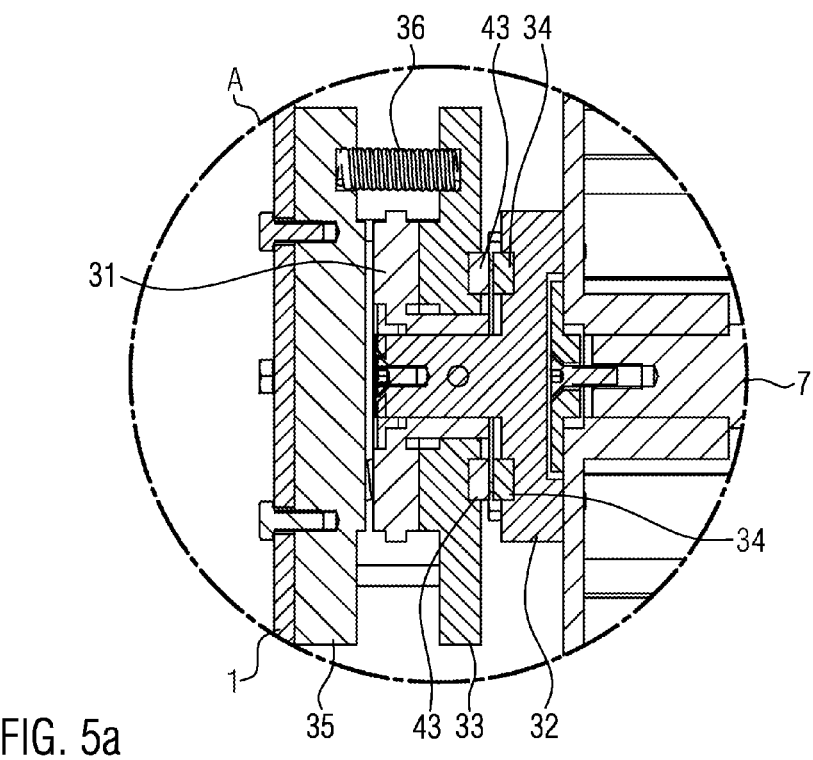
FIG. 5a shows an enlarged detail of FIG. 5.

FIG. 5 shows a first embodiment of a brake, and FIG. 5a shows an enlarged detail of FIG. 5. The brake disk 31 is here configured as a separate component, arranged on a shaft extension 32 and implemented as a floating brake disk. In addition, the shaft extension 32 and a first part 33 of the brake each have provided thereon a magnet 34, 43 such that the two magnets 34, 43 are arranged in opposed relationship with each other.

The magnet 34 in the shaft extension 32 may be a permanent magnet and the magnet 43 in the first part 33 of the brake may be an electromagnet. It is also possible that the magnet 34 in the shaft extension 32 is an electromagnet and that the magnet 43 in the first part 33 of the brake is a permanent magnet. In addition, both the magnet 34 in the shaft extension 32 and the magnet 43 in the first part 33 of the brake may be electromagnets.

Between a second part 35 of the brake, which is arranged on the cover 1 and the surface of which is provided with a brake pad, and the first part 33, which is provided with a brake pad on a surface facing the brake disk 31, the brake disk 31 is arranged. The first part 33 and the second part 35 are connected via a spring 36, so that, by means of said spring 36 cooperating with the magnets 34, 43, the distance between the first part 33 and the second part 35 can be reduced or enlarged or maintained. Through an applied electric voltage, the electromagnet 34, 43 acts on the permanent magnet 43, 34 or the electromagnets 34, 43 act one each other, so that they attract each other, whereby the spring 36 is expanded, so that the brake pads of the first part 33 and of the second part 35 are each spaced apart from the brake disk 31, i.e. the brake will not produce any braking or blocking effect. If the electric voltage applied is eliminated—e.g. in the case of a standstill of the drive or in the case of a general power failure—the magnets 34, 43 will repel each other and the expanded spring 36 can contract, so that the brake pads of the first part 33 and of the second part 35 of the brake disk 31 come into contact with one another and interact, thus causing the brake to brake or block.

Figure 6:
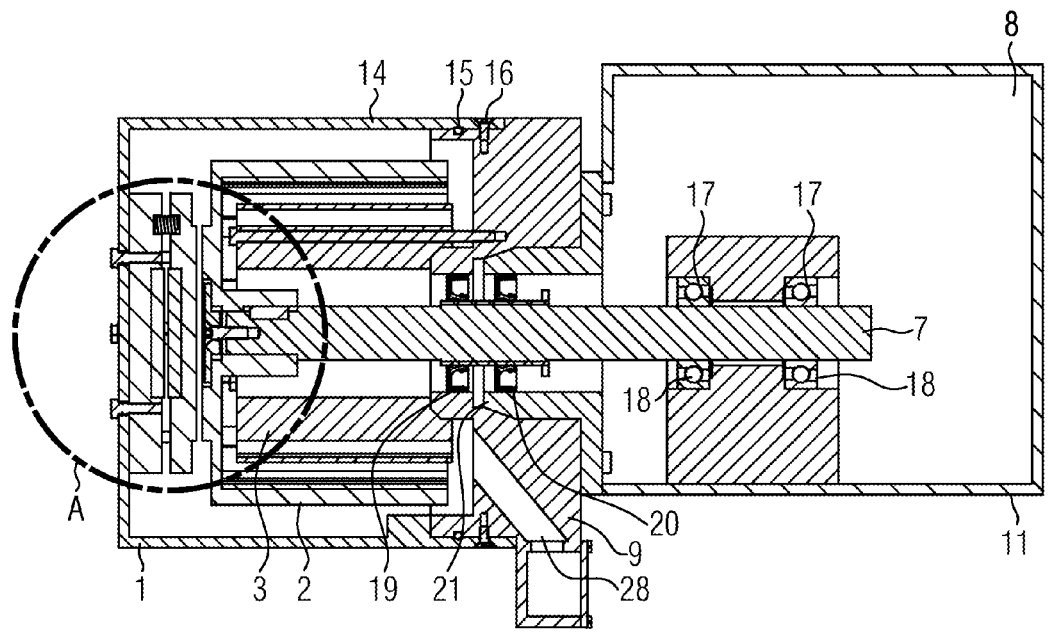
FIG. 6 shows a second embodiment of a brake.
Figure 6A:
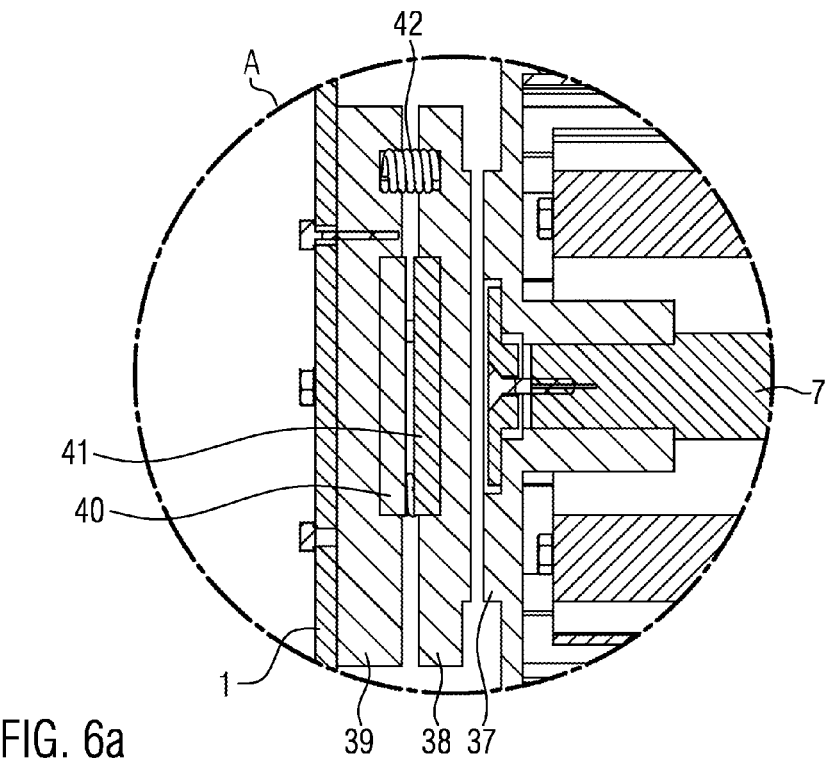
FIG. 6a shows an enlarged detail of FIG. 6.

FIG. 6 shows a second embodiment of a brake. A rotor bell 37 is here provided with a brake pad, which cooperates with a brake pad of a first part 38 of the brake. Between said first part 38 of the brake and a second part 39 of the brake, which is arranged on the cover 1, magnets 40, 41 are provided, and the first part 38 and the second part 39 are connected by a spring 42.

The magnet 40 in the second part 39 of the brake may be a permanent magnet and the magnet 41 in the first part 38 of the brake may be an electromagnet. It is also possible that the magnet 40 in the second part 39 of the brake is an electromagnet and that the magnet 41 in the first part 38 of the brake is a permanent magnet. In addition, both the magnet 40 in the second part 39 of the brake and the magnet 41 in the first part 38 of the brake may be electromagnets.

Through an applied electric voltage, the electromagnet 40, 41 acts on the permanent magnet 41, 40 or the electromagnets 40, 41 act one each other, so that they attract each other, whereby the spring 42 is compressed, so that the brake pads of the first part 38 of the brake and of the rotor bell 37 are spaced apart from one another, i.e. the brake will not produce any braking or blocking effect. If the electric voltage applied is eliminated, the magnets 40, 41 will repel each other and the compressed spring 42 can expand, so that the brake pads of the first part 38 and of the rotor bell 37 come into contact with one another and interact, thus causing the brake to brake or block.

Figure 7:
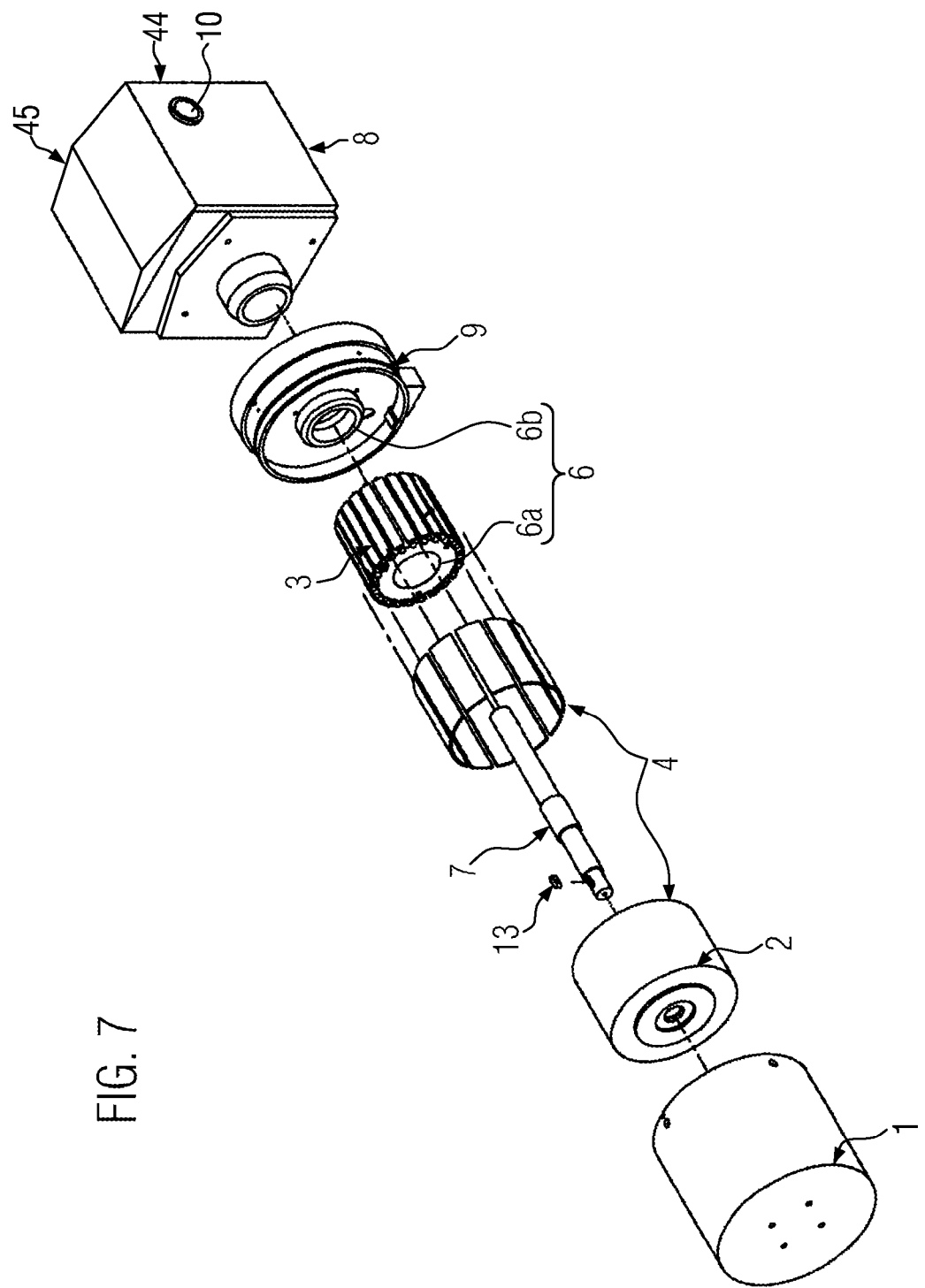
FIG. 7 shows a perspective view of the components of the drive, the upwardly directed surfaces of the gear casing being roof-shaped.

FIG. 7 shows a schematic representation of the components of an embodiment of a drive for a transport device, wherein the gear casing 44 is shaped such that the upwardly directed surfaces 45 of the gear casing 44 are roof-shaped, so that deposits or accumulations of liquid (puddles) on the upwardly directed surfaces will be avoided.

Figure 8:
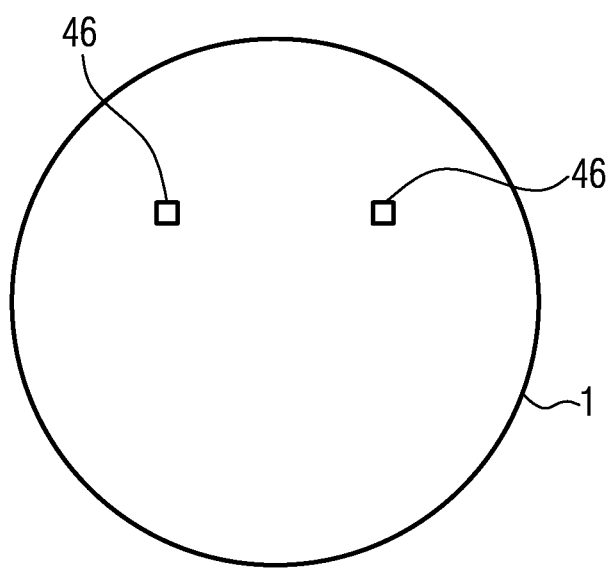
FIG. 8 shows a plan view of the cover with connection wires.

FIG. 8 shows a plan view of the cover 1 that is provided with connection wires 46 for a brake coil, which are configured such that, when the cover 1 and the motor housing 14 are connected in a form-fit manner, contacting will take place.

Figure 9:
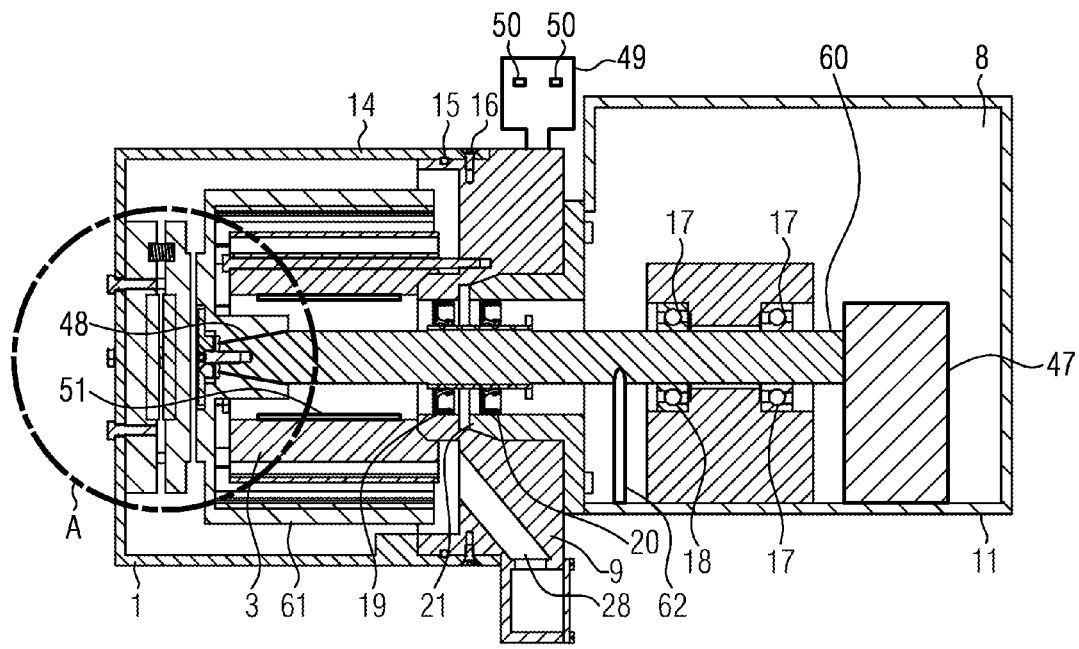
FIG. 9 shows a schematic cross-section through an embodiment of the drive.

FIG. 9 shows a schematic cross-section through an embodiment of the drive, wherein the rotor 61 is configured such that it is connectable to the shaft 60 by means of a cone 48. The stator 3 is centered centrally relative to the shaft 60 by means of a centering sleeve 51. The gear unit 8 comprises a stage 47 being configured as a space-increasing stage or as a speed-reducing stage. The adapter plate 9 comprises an external terminal board 50 by means of which motor coils 5 of the stator 3 can be contacted. The drive further comprises a return stop 62.

Figure 9A:
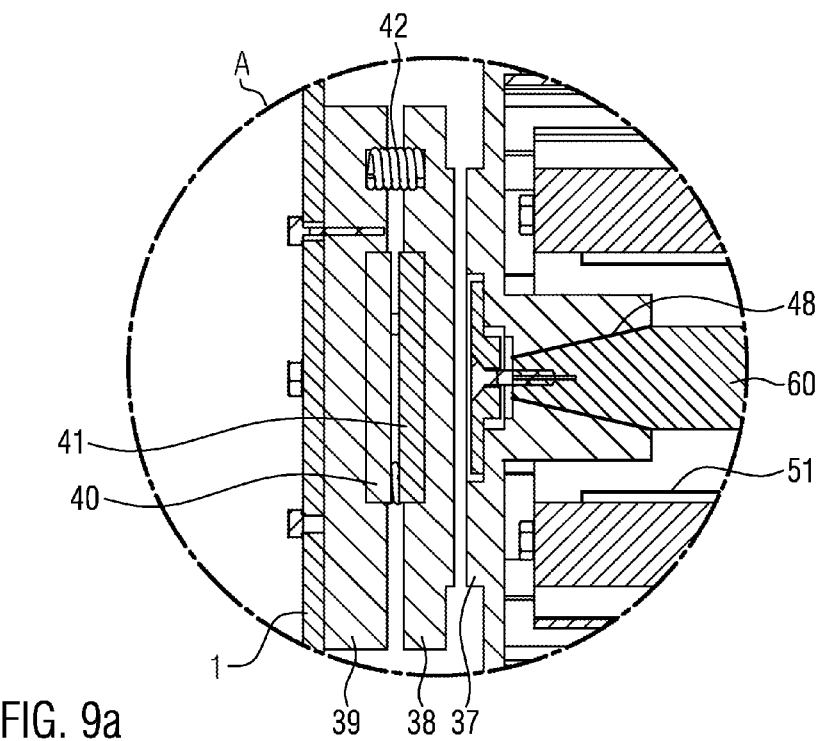
FIG. 9a shows an enlarged detail of FIG. 9.

FIG. 9*a* shows an enlarged detail of FIG. 9.

Figure 10:
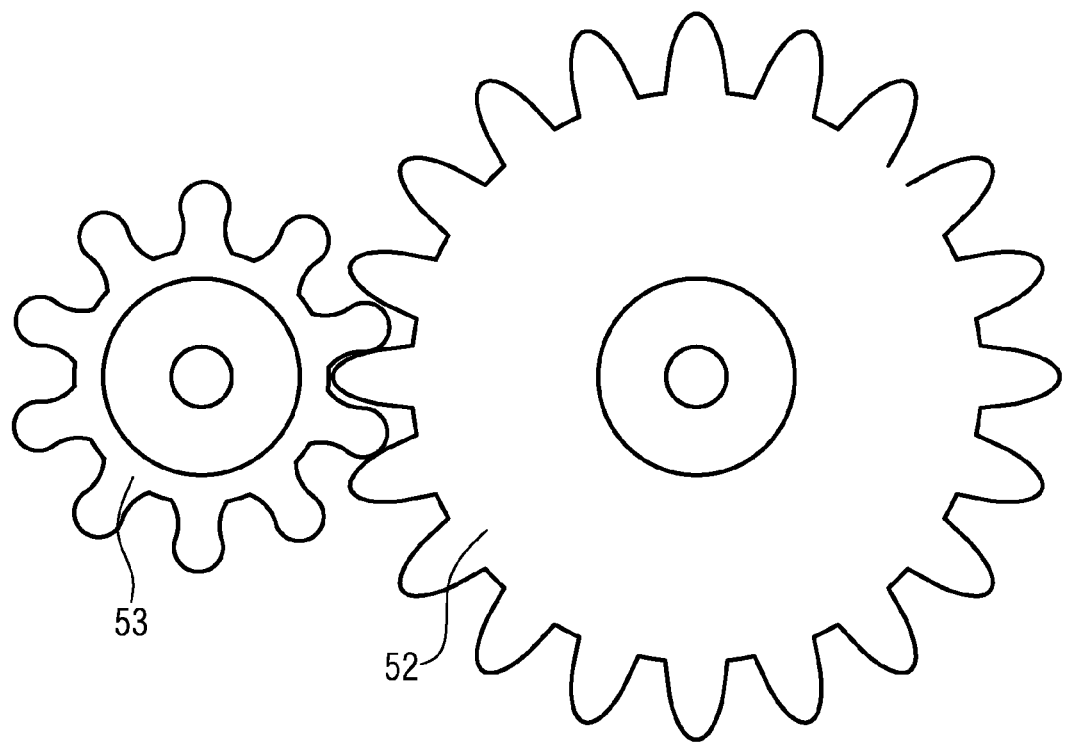
FIG. 10 shows spur gears.

FIG. 10 shows two spur gears 52, 53, wherein the speed-increasing stage/speed-reducing stage 47 may be realized by the interaction between the 2 spur gears 52, 53.

Figure 11:
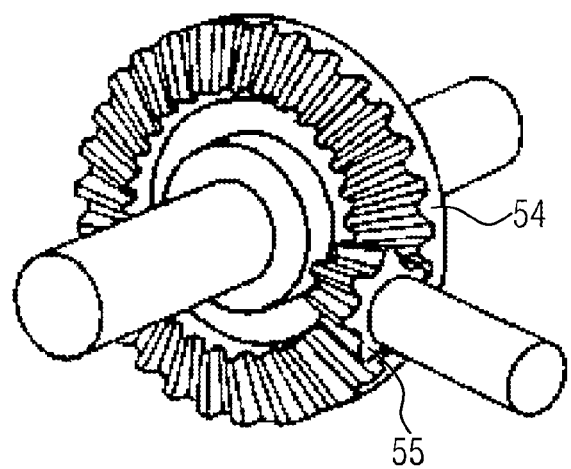
FIG. 11 shows bevel gears.

FIG. 11 shows bevel gears 54, 55, wherein the speed-increasing stage/speed-reducing stage 47 may be realized by the interaction between the bevel gears 54, 55.

Figure 12:
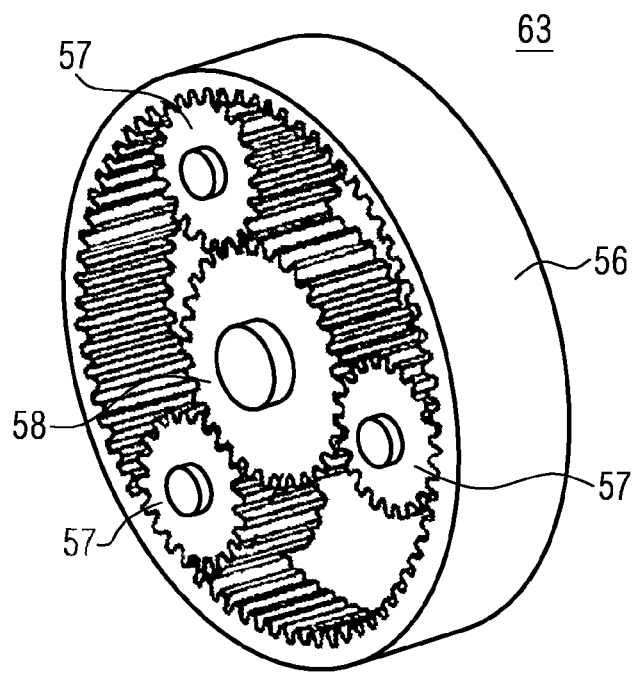
FIG. 12 shows a planetary gearing.

FIG. 12 shows a planetary gearing 63 with an annulus wheel 56, three planetary wheels 57, and a sun wheel 58, wherein the speed-increasing stage/speed-reducing stage 47 may be realized by means of the planetary gearing 63.

Figure 13:
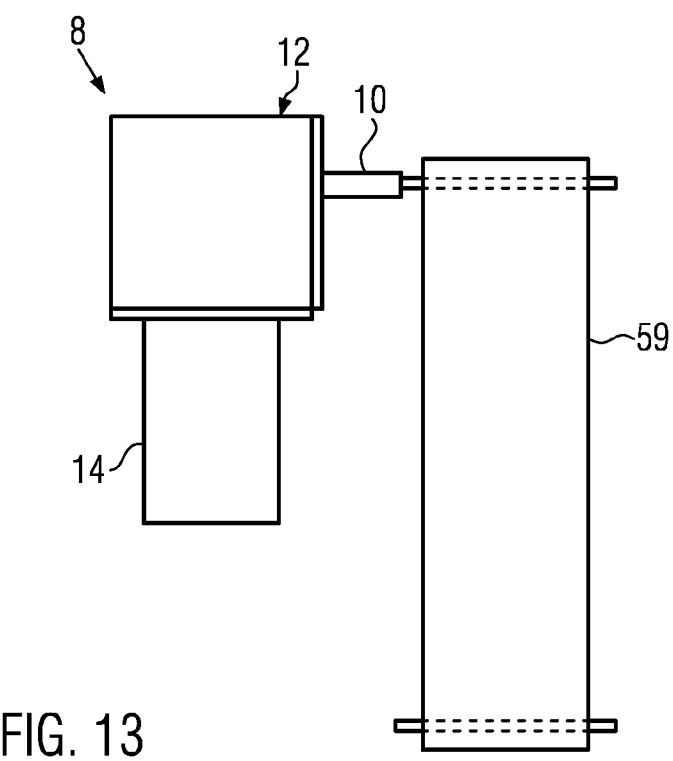
FIG. 13 shows a top view of a drive with a transport device.

FIG. 13 shows a top view of a drive with a transport device 59, the transport device 59 may be a transport belt or a conveyor belt for example.

Figure 14A:
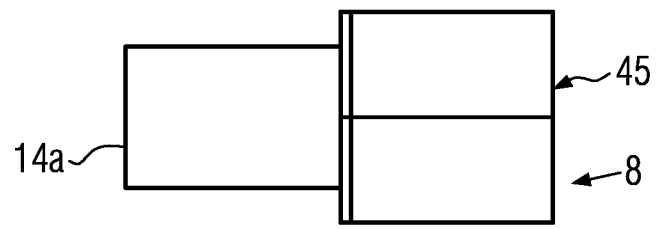
FIG. 14a shows a drive with an external rotor motor of a first size.
Figure 14B:
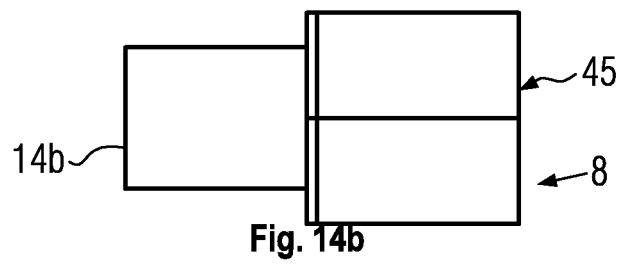
FIG. 14b shows a drive with an external rotor motor of a second size.
Figure 14C:
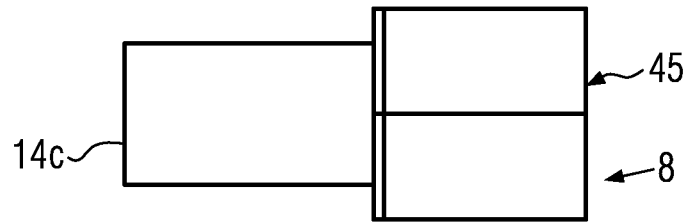
FIG. 14c shows a drive with an external rotor motor of a third size.

FIGS. 14*a*-14*c* show a set of drives with external rotor motors of different sizes. The external rotor motors of different sizes comprise stators 3 of identical diameter and different heights with corresponding rotors 2. In this context, height should be understood to mean the dimensions of the stator 3 along the longitudinal axis of the opening 6*a*. The different sizes are indicated by the different sizes of the respective motor housings 14*a*, 14*b*, 14*c*.

The invention claimed is:

1. A drive for a transport device said drive comprising:
an external rotor motor comprising a stator and a rotor,
a gear unit comprising a shaft and an input drive gear, wherein the shaft extends through the stator and up to the rotor, and
a double bearing provided in the gear unit, wherein the double bearing comprises two spaced-apart bearings being arranged along the longitudinal axis of the shaft within the gear unit,
the rotor being arranged on the shaft and being configured such that it is connectable to the shaft, in a form- and/or force-fit manner, by means of at least one of a group comprising a fitting key, a cone, and a fit,
the double bearing for the shaft being provided in the gear unit by making use of angular contact ball bearings, so as to ensure that forces of a brake will be taken up.

2. The drive according to claim 1, wherein the external rotor motor and the gear unit are of modular construction.

3. The drive according to claim 1, wherein the stator and the rotor are arranged in a motor housing.

4. The drive according to claim 3, wherein the motor housing comprises an internal, circumferentially extending rubber-elastic ring.

5. The drive according to claim 1, wherein the shaft is configured as a continuous component from the input gear in the gear unit up to the rotor.

6. The drive according to claim 1, wherein the stator is centered centrally relative to the shaft by means of a conical contact surface.

7. The drive according to claim 1, wherein the stator is centered centrally relative to the shaft by means of a centering sleeve and is fixed in position by means of screws.

8. The drive according to claim 7, wherein outer surfaces of the drive do not have any upwardly directed, horizontal surfaces.

9. The drive according to claim 8, wherein the rotor carries an iron ring, which establishes a magnetic circuit, the iron ring being at least one of a laminated sheet package or embedded in plastic.

10. The drive according to claim 9, wherein permanent magnets are inserted in the laminated sheet package or in the plastic in a form-fit manner and are there secured in position.

11. The drive according to claim 10, wherein the permanent magnets comprises one or more of a group comprising: hard ferrite, neodymium iron boron and aluminum nickel cobalt.

12. The drive according to claim 11, wherein an adapter plate is provided between the gear unit and the external rotor motor, wherein the adapter plate comprises an adapter-plate shaft sealing ring.

13. The drive according to claim 12, wherein the gear unit is open on a side facing the external rotor motor.

14. The drive according to claim 12, wherein the gear unit is enclosed and a gear-unit shaft sealing ring is provided so as to seal the shaft.

15. The drive according to claim 14, wherein a thread insert fixes the gear-unit shaft sealing ring in position.

16. The drive according to claim 14, wherein the gear-unit shaft sealing ring runs on a hardened sleeve, which is applied to the shaft.

17. The drive according to claim 16, wherein the gear unit does not have a vent screw.

18. The drive according to claim 17, wherein the gear unit is configured such that it comprises one, two, three or more than three speed-increasing stages or speed-reducing stages.

19. The drive according to claim 18, wherein a speed-increasing stage or speed-reducing stage is realized by one of interaction between two spur gears, interaction between a bevel gear and a spur gear, or by means of a planetary gearing.

20. The drive according to claim 19, wherein the gear unit comprises a hollow shaft on the output side, the hollow shaft at least one of comprising stainless steel or having a surface finish.

21. The drive according to claim 20, wherein the gear unit is configured for being oriented in four modes of orientation relative to the adapter plate and for connection to the adapter plate.

22. The drive according to claim 15, wherein the adapter plate additionally includes a hole leading from an area between the adapter-plate shaft sealing ring and the gear-unit shaft sealing ring downwards at an oblique angle to the exterior of the adapter plate, said area being defined, when the adapter plate and the gear unit are connected to one another in a form-fit manner.

23. The drive according to claim 22, wherein the hole is additionally provided with a sight glass on the exterior of the adapter plate.

24. The drive according to claim 23, wherein the adapter plate additionally comprises at least one passage for electric connection wires.

25. The drive according to claim 24, wherein the adapter plate comprises an external terminal board by means of which motor coils of the stator can be contacted.

26. The drive according to claim 25, further comprising a brake arranged in linear alignment with the rotor and the shaft.

27. The drive according to claim 26, the stator being arranged in a motor housing, wherein the brake is of a modular construction and is arranged in a cover of the motor housing.

28. The drive according to claim 27, wherein the brake is secured in position in the cover, said cover serving as a torque support of the brake.

29. The drive according to claim 28, wherein the brake comprises a brake disk arranged on one of an extended shaft or a rotor bell.

30. The drive according to claim 28, wherein a rotor bell comprises a brake surface.

31. The drive according to claim 27, wherein the cover comprises connection wires for a brake coil, which are configured such that, when the cover and the motor housing are connected in a form-fit manner, contacting will take place.

32. The drive according to claim 25, further comprising a return stop.

33. A set of drives comprising drives according to claim 32, wherein external rotor motors of different sizes, which comprise stators of identical diameter and different heights with corresponding rotors, and gear units having one of different speed-increasing stages or different speed-reducing stages, are provided.

34. The drive according to claim 1, wherein the transport device is a conveyor belt.

35. The drive according to claim 1, wherein the external rotor motor is not provided with a bearing for the shaft.

* * * * *